United States Patent
Garcia et al.

(10) Patent No.: US 12,456,246 B2
(45) Date of Patent: Oct. 28, 2025

(54) METHOD FOR LABELLING AN EPIPOLAR-PROJECTED 3D IMAGE

(71) Applicant: Continental Autonomous Mobility Germany GmbH, Ingolstadt (DE)

(72) Inventors: Lucien Garcia, Toulouse (FR); Thomas Meneyrol, Toulouse (FR); Spencer Danne, Toulouse (FR)

(73) Assignee: CONTINENTAL AUTONOMOUS MOBILITY GERMANY GMBH, Ingolstadt (DE)

( * ) Notice: Subject to any disclaimer, the term of this patent is extended or adjusted under 35 U.S.C. 154(b) by 106 days.

(21) Appl. No.: 18/575,423

(22) PCT Filed: Jul. 4, 2022

(86) PCT No.: PCT/EP2022/068379
§ 371 (c)(1),
(2) Date: Dec. 29, 2023

(87) PCT Pub. No.: WO2023/280745
PCT Pub. Date: Jan. 12, 2023

(65) Prior Publication Data
US 2024/0312105 A1    Sep. 19, 2024

(30) Foreign Application Priority Data
Jul. 8, 2021   (FR) ..................... 2107380

(51) Int. Cl.
*G06T 15/00*   (2011.01)
*G06T 7/50*   (2017.01)
(Continued)

(52) U.S. Cl.
CPC ............. *G06T 15/00* (2013.01); *G06T 7/50* (2017.01); *G06T 7/70* (2017.01); *G06V 10/25* (2022.01)

(58) Field of Classification Search
CPC .. G06T 15/00; G06T 7/50; G06T 7/70; G06T 7/74; G06T 7/55; G06T 2200/04;
(Continued)

(56) References Cited

U.S. PATENT DOCUMENTS

2003/0198378 A1* 10/2003 Ng ................. G06V 10/10
                                                   382/274
2006/0233436 A1* 10/2006 Ma ................. G06V 10/24
                                                   382/154
(Continued)

FOREIGN PATENT DOCUMENTS

| FR | 3083352 A1 | 1/2020 | |
|---|---|---|---|
| GB | 2536271 A * | 9/2016 | ............... G06T 7/62 |
| WO | 2017216465 A1 | 12/2017 | |

OTHER PUBLICATIONS

International Search Report and Written Opinion for International Application No. PCT/EP2022/068379, dated Oct. 31, 2022, 10 pages.
(Continued)

*Primary Examiner* — Sarah Lhymn
(74) *Attorney, Agent, or Firm* — Buchanan Ingersoll & Rooney PC (57) ABSTRACT

A method for labeling a 3D image of a scene acquired by a 3D sensor including: receiving: a 2D image of the same scene acquired by a camera, coordinates, in the 2D image, of a set of pixels delineating the region of interest, and of a reference point belonging to the region of interest, and determining the depth of the reference point in a coordinate system associated with the camera; assigning, to the pixels delineating the region of interest in the 2D image, a depth corresponding to the depth of the reference point; computing the coordinates, in the 3D image, of the pixels delineating the region of interest, based on the coordinates of the pixels delineating the region of interest in the 2D image and on the
(Continued)

depth assigned to the pixels delineating the region of interest.

9 Claims, 3 Drawing Sheets

(51) Int. Cl.
*G06T 7/70* (2017.01)
*G06V 10/25* (2022.01)

(58) Field of Classification Search
CPC . G06T 2207/10028; G06T 2207/20101; G06T 2207/20104; G06T 2219/004; G06V 10/25; H04N 2013/0081; H04N 13/106; H04N 13/111; H04N 13/117
See application file for complete search history.

(56) References Cited

U.S. PATENT DOCUMENTS

| | | | |
|---|---|---|---|
| 2015/0172715 A1 | 6/2015 | Shimizu et al. | |
| 2018/0350073 A1* | 12/2018 | Shokri | A61B 5/1072 |
| 2020/0210726 A1 | 7/2020 | Yang et al. | |
| 2021/0358163 A1* | 11/2021 | Keinert | G06T 7/50 |
| 2023/0222798 A1* | 7/2023 | Figueras Junyent | G06T 3/04 382/159 |
| 2023/0298203 A1* | 9/2023 | Besbes | G06T 7/75 382/103 |

OTHER PUBLICATIONS

French Search Report for French Application No. 210738, dated Jul. 8, 2021 with translation, 15 pages.

International Search Report and Written Opinion for International Application No. PCT/EP2022/068379, dated Oct. 31, 2022, 14 pages (French).

Qi et al., "ImVoteNet: Boosting 3D Object Detection in Point Clouds with Image Votes" 2020 IEEE/CVF Conference on Computer Vision and Pattern Recognition (CVPR), (Jan. 2020), pp. 4404-4413.

Wang et al., "Label Propagation from ImageNet to 3D Point Clouds" 2013 IEEE Conference on Computer Vision and Pattern Recognition, (Jun. 23-28, 2013), pp. 3135-3142.

Office Action (Examination Report) issued Jul. 2, 2025, by the Patent Office, Government of India, in corresponding India Patent Application No. 202437000388 with an English Translation of the Office Action. (8 pages).

* cited by examiner

METHOD FOR LABELLING AN EPIPOLAR-PROJECTED 3D IMAGE

CROSS REFERENCE TO RELATED APPLICATIONS

This application is the U.S. National Phase Application of PCT International Application No. PCT/EP2022/068379, filed Jul. 4, 2022, which claims priority to French Patent Application No. 2107380, filed Jul. 8, 2021, the contents of such applications being incorporated by reference herein.

FIELD OF THE INVENTION

The present disclosure relates to the field of labeling of regions of interest in 3D images obtained using RADAR or LIDAR 3D sensors or time-of-flight cameras.

BACKGROUND OF THE INVENTION

It is known to label, i.e. to identify, in a scene acquired by a 3D sensor of a vehicle, various regions of interest that may, for example, reveal the presence of a particular object or of an obstacle in the environment of the vehicle. This labeling is done manually by asking an operator to identify, in each 3D image, the region of interest. The regions of interest identified by the operator are then used as reference to validate automatic-detection algorithms and to generate a training dataset allowing machine-learning-based detection algorithms to be developed.

However, it is not easy for the operator to identify regions of interest in 3D images. Specifically, each pixel of a 3D image contains information relating to a distance between the measurement point and the sensor, and it is not easy for the human eye, which is more accustomed to interpreting images acquired by cameras, to interpret this information. Specifically, in 3D images the colors of the pixels correspond to distances whereas in 2D images the colors of the pixels correspond to the actual colors of the objects present in the scene. In addition, the measurement points obtained with 3D sensors are in general spaced further apart than the measurement points of a standard camera. Thus, it is more complex and less foolproof to label regions of interest in a 3D image than in a 2D image. There is therefore a need to find a means allowing regions of interest in 3D images to be more reliably labeled.

SUMMARY OF THE INVENTION

An aspect of the present application improves the situation by providing a means allowing regions of interest in 3D images to be identified reliably, and in particular with greater exactness.

What is proposed is a method for labeling a 3D image of a scene acquired by a 3D sensor comprising identifying at least one region of interest in the 3D image, the method being implemented by a computer and comprising:
a step of receiving:
a 2D image of the same scene, acquired by a camera,
coordinates, in the 2D image, of a set of pixels delineating the region of interest,
coordinates, in the 2D image, of a reference point belonging to the region of interest, and
data relating to the relative position and relative orientation of the camera with respect to the 3D sensor,
a step of determining the depth of the reference point in a coordinate system associated with the camera, said step comprising:
based on the coordinates of the reference point in the 2D image, determining the two-dimensional coordinates of a plurality of first points in the 3D image, each first point corresponding to a possible position of the reference point in the 3D image,
obtaining, for each first point, a third depth coordinate with respect to the 3D sensor,
for each first point of the 3D image, obtaining the coordinates of the corresponding point in the 2D image, based on the depth coordinate of the first point, selecting, in the 2D image, the first point closest to the reference point, and,
assigning, to the reference point, a depth corresponding to the depth of the first selected point,
a step of assigning, to the pixels delineating the region of interest in the 2D image, a depth corresponding to the depth assigned to the reference point,
a step of computing the coordinates, in the 3D image, of the pixels delineating the region of interest, based on the coordinates of the pixels delineating the region of interest in the 2D image, on the depth assigned to the pixels delineating the region of interest and on the data relating to the relative position and relative orientation of the camera with respect to the 3D sensor.

According to another aspect, a computer program comprising instructions that implement all or some of a method such as defined in the present document when this program is executed by a computer is provided. According to another aspect, a non-transient computer-readable storage medium on which such a program is stored is provided.

The features disclosed in the following paragraphs may, optionally, be implemented independently of one another or in combination with one another:

In one embodiment, determining the two-dimensional coordinates of the plurality of first points in the 3D image comprises:
assigning a maximum depth to the reference point,
assigning a minimum depth to the reference point,
computing two-dimensional coordinates, in the 3D image, of a first furthest point corresponding to the reference point to which the maximum depth was assigned,
computing two-dimensional coordinates, in the 3D image, of a first closest point corresponding to the reference point to which the minimum depth was assigned, and
determining the two-dimensional coordinates, in the 3D image, of at least one first point located between the first closest point and the first furthest point.

In one embodiment, determining the two-dimensional coordinates, in the 3D image, of at least one first point located between the first closest point and the first furthest point comprises determining two-dimensional coordinates of at least one point located, in the 3D image, on a segment connecting the first furthest point and the first closest point.

In one embodiment, determining the two-dimensional coordinates, in the 3D image, of at least one first point located between the first closest point and the first furthest point comprises:
assigning, to the reference point, at least an intermediate depth comprised between the maximum depth and the minimum depth, and
computing two-dimensional coordinates, in the 3D image, of a first point corresponding to the reference point to which the intermediate depth was assigned.

In one embodiment, determining the two-dimensional coordinates of the plurality of first points in the 3D image comprises:

assigning, to the reference point, a depth of one of a minimum depth or maximum depth, computing two-dimensional coordinates, in the 3D image, of a first end point corresponding to the reference point to which one of a minimum or maximum depth was assigned, and computing, based on the horizontal resolution of the 3D sensor and on the distance between the 3D sensor and the camera, a maximum disparity corresponding to a maximum number of pixels in the 3D image separating the first end point and a point in the 3D image corresponding to the reference point to which the other, minimum or maximum, depth was assigned, determining the two-dimensional coordinates of each point of the 3D image comprised between the first end point and a point laterally separated from the first end point by the maximum disparity.

In one embodiment, the set of pixels delineating the region of interest in the 2D image comprises four pixels delineating a rectangle.

In one embodiment, the region of interest, in the 2D image, has a predetermined geometric shape and the method further comprises a step of defining a region of interest in the 3D image having the same geometric shape as the region of interest in the 2D image.

The labeling method described above is particularly applicable when generating a training dataset or validating algorithms for automatically detecting regions of interest in 3D images.

According to an aspect of the invention, operators may identify a relevant region of a 2D image taken by a camera, for example a region corresponding to a pedestrian or vehicle, for example using a rectangle, and create reference images. The method described above may then be used to determine a corresponding region of the reference image in data acquired by 3D sensors, i.e. data able to determine a distance between the sensor and the point in question. A training dataset may thus be generated for learning algorithms intended to locate objects, such as pedestrians or vehicles, for example. Moreover, when algorithms allowing objects to be located in data acquired by 3D sensors have already been developed, the method described above may be implemented to compare the regions detected by the algorithm with the regions corresponding to the objects identified by operators using images taken by cameras. This comparison makes it possible to evaluate the performance of the detection algorithm.

BRIEF DESCRIPTION OF THE DRAWINGS

Other features, details and advantages will become apparent on reading the following detailed description, and on analyzing the appended drawings, in which.

DETAILED DESCRIPTION OF THE PREFERRED EMBODIMENTS

Figure 1:
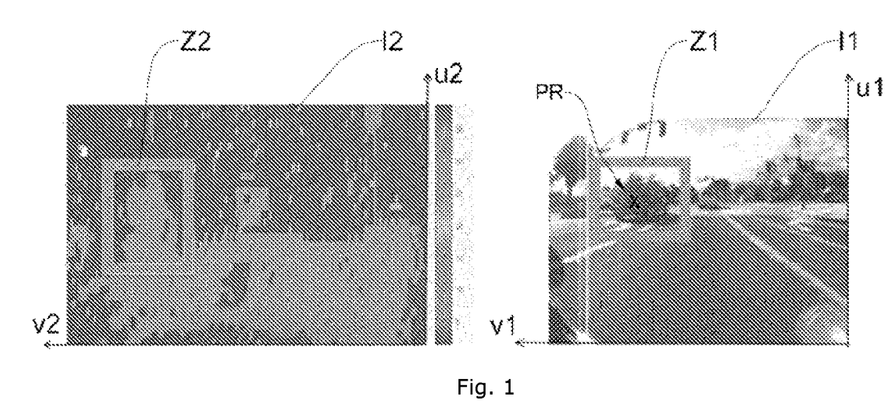
FIG. 1 schematically illustrates a 3D image and a 2D image of the same scene acquired by a 3D sensor and by a camera at the same time, respectively.

FIG. 1 illustrates, by way of example, two images I1 and I2 of the same scene acquired by a 2D camera and a 3D sensor at the same time, respectively. The coordinate system (u1, v1) associated with the image I1 and the coordinate system (u2, v2) associated with the image I2 have also been shown. These coordinate systems are used to determine the two-dimensional coordinates of a point of the image I1 and of a point of the image I2. In the rest of the application, image I1 will be referred to as the 2D image and image I2 will be referred to as the 3D image. The 2D images are acquired by standard cameras while the 3D images are acquired using LIDAR or RADAR technologies or even using cameras configured to measure time of flight (i.e. time-of-flight cameras).

As may be seen in the image I2, the colors of each point of image I2, here shown in grayscale, are representative of a distance between a measurement point of coordinates (u2, v2) and the plane of the image. In the rest of the application, this distance is called depth because it is a question of a distance along an axis z2 perpendicular to the axes u2 and v2. The axis z2 has also been depicted in FIG. 3, which shows the coordinate system associated with the 3D sensor.

The image I1 contains a region of interest Z1, for example one marked by a rectangle as shown here. In the example described here, the region of interest Z1 encircles an object or person, here a vehicle. Depending on the intended application, other types of objects may be considered, such as traffic signs for example.

An aim of the present invention is to obtain, based on information regarding the position of the region of interest Z1 and on a reference point PR in the 2D image, the position of the corresponding region Z2 in the image I2. The reference point PR is a point belonging to the region of interest Z1, here a point of the vehicle, that will subsequently be considered to be located in the same plane as the region Z1 delineating the obstacle.

It will be noted that, for this purpose, the depth data contained in the 3D image are also used, as explained in more detail with reference to FIG. 2.

In the example described here, the region of interest Z1 and the reference point PR are defined by an operator, who encircles the region of interest Z1 with a rectangle and marks the reference point PR with a suitable human-machine interface, for example using a mouse. This is an example and the regions of interest may be marked by other geometric shapes such as triangles or circles. According to another embodiment, the region of interest Z1 and the reference point PR are defined using an automatic process.

Figure 2:
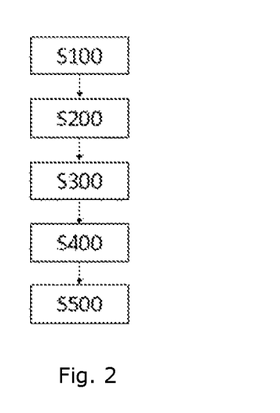
FIG. 2 illustrates a method for labeling a 3D image according to one embodiment.

The labeling method of FIG. 2 is implemented by a processor, for example in a computer, and comprises: a step S100 of receiving data; a step S200 of determining the depth pr of the reference point PR in a coordinate system associated with the camera; a step S300 of assigning, to the pixels delineating the region of interest Z1 in the image I1, a depth corresponding to the depth pr assigned to the reference point PR; and a step S400 of computing coordinates, in the image I2, of the pixels delineating the region of interest Z2, based on the coordinates of the pixels delineating the region of interest Z1 in the image I1 and on the depth pr assigned to the pixels delineating the region of interest Z1.

Step S100 comprises receiving an image I1 acquired by a camera corresponding to the same scene as the image I2 acquired by a 3D sensor such as a LIDAR or RADAR or a time-of-flight camera. Step S100 also comprises receiving an image I2 acquired by the 3D sensor C3D. It will be noted that the images I1 and I2 are acquired substantially at the same time by the camera and the 3D sensor, as explained below, then transmitted to the processor implementing the method. In the example described here, the images are transmitted to a processor comprised in a computer.

Step S100 also comprises receiving the coordinates of a set of pixels delineating the region of interest Z1. In the example described here, the region of interest Z1 is delineated by a rectangle and the processor receives the coordinates of the four pixels PZ1 located at the corners of the rectangle.

Step S100 also comprises receiving the coordinates (uPR, vPR) of the reference point PR in the coordinate system associated with the image I1.

Step S100 also comprises receiving data relating to the position and orientation of the camera with respect to the 3D sensor.

Figure 3:
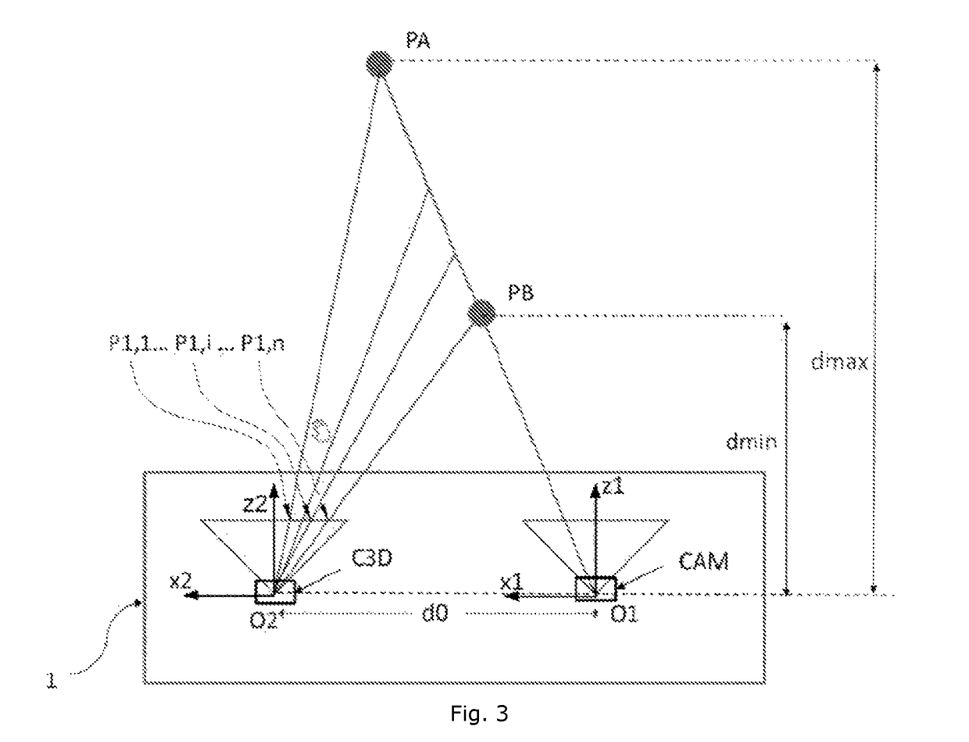
FIG. 3 schematically illustrates the system used to acquire 2D and 3D images and various coordinate systems and annotations.

FIG. 3 illustrates a system 1 used to acquire the scene outside a vehicle seen from above. For this purpose, the system 1 comprises a camera CAM and a 3D sensor C3D of LIDAR or RADAR type placed on or inside the vehicle (not shown). It will be noted that the 3D sensor may also be a time-of-flight camera, which differs from a standard camera allowing only 2D images to be acquired. Acquisition of the images is preferably controlled so that the 2D and 3D images are taken at the same time. The camera CAM and the 3D sensor C3D are then synchronized and have the same acquisition frequency. In contrast, when the acquisition frequencies of the camera CAM and of the 3D sensor C3D are different but sufficiently high, two images I1 and I2 acquired in a sufficiently narrow interval may be selected. By way of indication, two images I1 and I2 acquired with a 30 ms interval therebetween may for example be considered to correspond to the same scene. Such a time interval corresponds to an offset of 25 cm between the two images when the vehicle is traveling at a speed of 30 km/h. Of course, this time interval may be adapted depending on the measured speed of the vehicle and/or on the resolution of the 3D sensor used.

A coordinate system R1 associated with the camera CAM and a coordinate system R2 associated with the 3D sensor C3D have also been shown in FIG. 3. The coordinate system R1 associated with the camera has its origin O1 at the optical center of the camera CAM and comprises axes x1, y1 having the same orientation as the axes u1 and v1 of the coordinate system associated with the image I1. The coordinate system R1 also comprises an axis z1 perpendicular to the axes x1, y1 and oriented along the optical axis of the camera. The coordinate system R2 associated with the 3D sensor C3D has an origin O2 and two axes x2, y2 having the same orientation as the axes u2 and v2 of the coordinate system associated with the image I2. The axis z2 is perpendicular to the axes x2, y2. It will be noted that, in the present application, depth refers to the distance between a point and the center of the associated coordinate system along one of the axes z1 or z2 depending on the coordinate system in question.

As shown in FIG. 3, the camera C and the 3D sensor are spaced apart by a distance do, of the order of 10 cm for example, between the center O1 of the coordinate system R1 and the center O2 of the coordinate system R2. In FIG. 3, in order to simplify the representation, the coordinate systems R1 and R2 have been shown with the same orientation and are spaced apart by the distance d0. In practice, the coordinate systems R1 and R2 do not have exactly the same orientation, and hence a coordinate transformation TR12 is used to convert from the coordinates of a point in the coordinate system R1 to the coordinates of the corresponding point in the coordinate system R2 and a coordinate transformation TR21 is used to convert from the coordinates of a point in the coordinate system R2 to the coordinates of the corresponding point in the coordinate system R1. The transformations TR12 and TR21 are rigid transformations comprising a translation and a rotation of one coordinate system with respect to the other. Thus, the data relating to the position and orientation of the camera with respect to the 3D sensor are data allowing coordinate transformations to be established between the coordinate system R1 and the coordinate system R2. It may for example be a question of three angles and of three distances, the three angles defining the orientation of an axis of the coordinate system R1 with respect to the corresponding axis of the coordinate system R2 and the three distances defining the relative position of the center of the coordinate system R1 with respect to the center of the coordinate system R2. These three angles and these three distances may be obtained in a prior calibrating step. As a variant, it may be a question of extrinsic parameters of the 3D sensor C3D and of the camera CAM. These are obtained during a calibrating step known to those skilled in the art and not described here. It is thus possible, using extrinsic parameters of the camera and of the 3D sensor, to determine the transformation for converting between the coordinate systems associated with these two sensors. For example, when working with homogeneous coordinates, it is sufficient to multiply two 4×4 coordinate-converting matrices comprising the rotation and translation with respect to a reference coordinate system common to the camera and 3D sensor. In the present case, the reference coordinate system may have its origin at a place on the vehicle and have axes defining horizontal and vertical planes with respect to the ground, the z-axis being oriented toward the environment of the vehicle.

Step S100 also comprises receiving intrinsic parameters of the camera and of the 3D sensor. These parameters are also obtained in the calibrating step and allow, based on the coordinates (u1, v1) and (u2, v2) of the pixels in the images I1, I2, the corresponding two-dimensional coordinates (x1, y1) and (x2, y2) to be obtained in the coordinate systems R1 and R2, respectively. They may for example be stored in a memory of the camera and of the 3D sensor or in metadata associated with the files containing the 2D and 3D images.

In a manner known to those skilled in the art, the intrinsic parameters of the camera comprise the focal length of the optics, the coordinates of the optical center, and an angle of inclination of the pixels, and the intrinsic parameters of the 3D sensor comprise its horizontal and vertical angular resolution. These intrinsic parameters, just like the extrinsic parameters, may be stored in matrix form so as to facilitate the conversion between the coordinate system associated with the image and the coordinate system associated with the camera or with the sensor. It will be noted that the third coordinate z2 in the coordinate system R2 is already contained in the 3D image I2 and corresponds to the value of the pixel of coordinates (u2, v2). It is thus easy to obtain, using the 3D image, the three-dimensional coordinates in the coordinate system R2 corresponding to a pixel of the image I2. In contrast, it is not possible, based on the coordinates (u1, v1) of a pixel of the 2D image I1, to obtain the 3D coordinates of the corresponding point in the coordinate system R1 associated with the camera, since information regarding the depth z1 is not contained in the image I1. Specifically, as may be seen in FIG. 3, the reference point PR may be located anywhere on a straight line connecting the points PA and PB. It is assumed here that the reference point lies between the points PA and PB. The point PA corresponds to the position of the reference point PR when the latter is at a maximum distance dmax corresponding to a maximum depth. The point PB corresponds to the position of the reference point PR when the latter is at a minimum distance dmin corresponding to a minimum depth. For example, dmin and dmax may be chosen depending on the depth range that the 3D sensor is capable of measuring, so that dmin and dmax correspond to the minimum depth and to the maximum depth that the 3D sensor is capable of measuring. It will also be noted that, as illustrated by the points P1,1 ... . P1,n in FIG. 3, if it is considered that the reference point PR may be located on the straight line segment between the points PA and PB, the latter may be located at various points P1,1 .... P1,n in the 3D image I2. Care will therefore be taken to ensure that the resolution of the 3D sensor used is sufficiently high.

Step S200 allows the depth pr of the reference point PR in the coordinate system R1 to be determined using the depth data measured by the 3D sensor for each of the points P1,1 ... P1,n. Next, this depth pr is assigned to each of the pixels delineating the region of interest Z1, this allowing, in step S400, the corresponding coordinates to be determined for all of these pixels in the 3D image.

Thus, step S200 comprises a sub-step of determining the two-dimensional coordinates in the 3D image of the points P1,1 ... P1,n, each of the points P1,1 ... P1,n corresponding to one possible position of the reference point PR in the 3D image depending on the depth associated therewith, which may be between dmin and dmax as described here.

The sub-step of determining the two-dimensional coordinates in the 3D image of the points P1,1 ... P1,n may be implemented in various ways.

In a first variant, the two-dimensional coordinates of the points PA and PB are determined in the 3D image. It will be recalled here that the point PA corresponds to the reference point PR to which the depth dmax was assigned and that the point PB corresponds to the reference point PR to which the depth dmin was assigned. It will be noted that the point PA, which corresponds to the reference point when it is furthest away, has been represented in the 3D image by the point P1,1. The point PB, which corresponds to the reference point when it is closest, has been represented in the 3D image by the point P1,n.

To determine the coordinates of the points P1,1 and P1,n in the image I2, the coordinates corresponding to the reference point PR of coordinates (uR, vR) in the coordinate system R1 associated with the camera are first determined. To this end, the intrinsic parameters of the camera are used to determine the corresponding two-dimensional coordinates along the axes x1, y1. Additional intrinsic parameters may optionally and facultatively be taken into account to cancel out distortion-related effects induced by the optics of the camera. The third coordinate of depth along the axis z1 corresponds to the depth dmax or to the depth dmin depending on the point PA or PB in question. Next, a conversion of coordinate system is carried out to obtain the corresponding coordinates in the coordinate system R2 using the coordinate transformation TR12 and the intrinsic parameters of the 3D sensor are used to obtain the two-dimensional coordinates of the points P1,1 and P1,n corresponding to the points PA and PB in the 3D image I2 respectively, as shown in FIG. 3.

Figure 5:
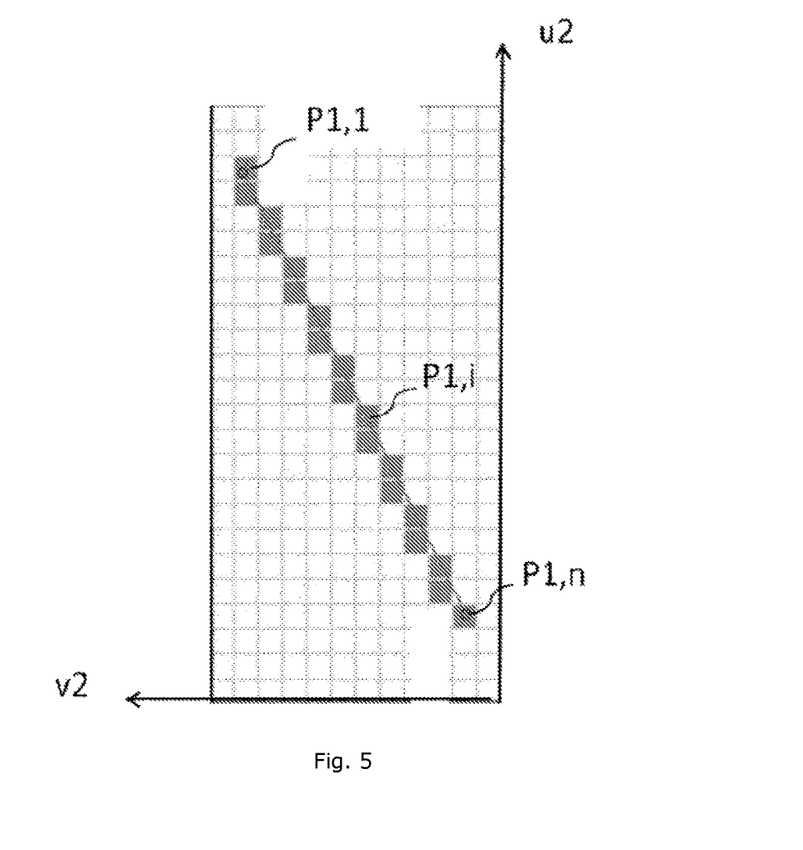
FIG. 5 illustrates the Bresenham's algorithm used in the method according to one variant of embodiment.

The two-dimensional coordinates in the 3D image of at least one point P1,i lying on a segment connecting P1,1 to P1,n are then determined. This may be done using Bresenham's algorithm, which allows the coordinates of points lying on a straight line segment to be determined, as illustrated in FIG. 5. This algorithm is more particularly described in the article "Algorithm for Computer Control of a Digital Plotter", Jack E. Bresenham, IBM Systems Journal, 4(1): 25-30, 1965.

In a second variant, instead of using Bresenham's algorithm to determine the coordinates of at least one point P1,i on a straight line segment between P1,1 and P1,n, at least one reference point lying between PA and PB is assigned a depth intermediate between the minimum depth dmin and the maximum depth dmax, then its corresponding coordinates are determined in the 3D image as described above.

In a third variant, it is possible to determine, for the point PA for example, which corresponds to the reference point to which a maximum depth was assigned, its corresponding coordinates in the 3D image. In this case these are the coordinates in the 3D image of the point P1,1, which are determined as described above. A maximum disparity is then computed, based on the horizontal resolution of the 3D sensor, which is one of the intrinsic parameters of the 3D sensor, and on the distance between the 3D sensor and the camera d0. The maximum disparity DM is computed as follows:

$$DM = \tan^{-1}\left(\frac{d0}{d\min}\right)/rh \qquad \text{[Math. 1]}$$

where rh is the horizontal resolution of the 3D sensor, d0 is the distance between the centers O1, O2 of the coordinate systems R1 and R2 in the direction of the axis x2 of the coordinate system R2 and dmin is the minimum depth considered for the reference point. A maximum disparity of 3 pixels is thus obtained with dmin=3 m, rh=0.78°/pixel and d0=10 cm.

The maximum disparity corresponds to a maximum number of pixels in the 3D image separating an end point of the set of points P1,i, here the point P1,1, from another end point of the set of points P1,i, here the point P1,n. The maximum disparity makes it possible, based on the coordinates of one end point, here the point P1,1, to compute the coordinates of the other end point P1,n. The time taken to compute the coordinates of the points P1,1 and P1,n is thus reduced. Next, the coordinates of the points P1,i located on a segment connecting the point P1,1 to the point P1,n are determined as described above with Bresenham's algorithm.

It will be noted that it is alternatively also possible to determine the coordinates in the 3D image of the point P1,n, and to determine the coordinates of the point P1,1 using the maximum disparity.

This third variant is faster and requires fewer computing resources than the other two variants. This variant may be used in the particular case illustrated in FIG. 3 when the 3D sensor and the camera are located at substantially the same height with respect to the ground. The overlap region is thus maximized and conversions of coordinate system simplified.

Step S200 also comprises a sub-step of obtaining, for each point P1,i (1≤i≤n), the associated depth pi contained in the 3D image. This is the depth pi read at the point P1,i of coordinates (u2i, v2i) in the 3D image I2.

Step S200 then comprises a sub-step of computing the coordinates of each point P2,i in the image I1 corresponding to a point P1,$i$ of the image I1. To d0 this, first of all, for each point P1,$i$ (1≤i≤n) of the 3D image, the corresponding coordinates in the coordinate system R2 associated with the 3D sensor are determined. For this purpose, the intrinsic parameters of the 3D sensor and the third coordinate of depth along the axis z2 are used to determine the corresponding two-dimensional coordinates along the axes x2, y2. The third coordinate of depth along the axis z2 corresponds to the depth value pi contained in the 3D image for the corresponding point. Next, a conversion of coordinate system is carried out to obtain the corresponding coordinates in the coordinate system R1 using the coordinate transformation TR21. It will be noted that the coordinate transformation TR21 corresponds to the inverse of the coordinate transformation TR12 used previously. Lastly, the intrinsic parameters of the camera are used to obtain the coordinates of the corresponding point P2,$i$ in the 2D image I1 along the axes u1, v1. It will be noted that the intrinsic parameters make projection into the coordinate system associated with the image I1, of axes u1, v1, possible. As mentioned above, it is also possible to take into account distortion induced by the optics of the camera by taking into account additional intrinsic parameters representative of this distortion. It will be noted that the points P1,$i$ and P2,$i$ correspond to possible positions of the reference point in the 3D image and in the 2D image respectively, depending on the depth pi assigned thereto. The step S200 further comprises a step of selecting, in the 2D image, the point P2,$i$ closest to the reference point PR of coordinates (uR, vR). It is possible, to do this, to determine, using the coordinates of the point P2,$i$ (u1i, v1i) in the 2D image and the coordinates of the point PR (uR, vR), the distance between these two points, for example on the basis of the following formula:

$$d = \sqrt{(uR - u1i)^2 + (vR - v1i)^2}$$ [Math. 2]

The point P2,$i$, of coordinates (u1i, v1i), the distance of which to the reference point PR of coordinates (uR, vR) is the smallest, is then selected.

The corresponding depth pi is then assigned to the reference point PR, thus pr=pi. It will be recalled here that the depth pi in question is the depth of the point P1,$i$ corresponding to the selected point P2,$i$.

Next, step S300 of assigning to the pixels PZ1 delineating the region of interest Z1 in the 2D image I1 a depth corresponding to the depth pi assigned to the reference point PR is implemented, then step S400 is implemented.

In step S400, the coordinates of the pixels PZ2 in the 3D image corresponding to the pixels PZ1 delineating the region of interest in the 2D image are determined. It will be recalled that the pixels PZ1 in the example described here are 4 pixels located in the corners of the rectangle delineating the region of interest Z1 as illustrated in FIG. 4.

To d0 this, first of all, for each pixel PZ1 delineating the region of interest in the 2D image, the corresponding coordinates in the coordinate system R1 associated with the camera are determined. To this end, the intrinsic parameters of the camera are used to determine the corresponding two-dimensional coordinates along the axes x1, y1. As mentioned above, additional intrinsic parameters may optionally be taken into account to cancel out the distortion-related effects. The third coordinate of depth along the axis z1 corresponds to the depth pr of the reference point PR assigned to each of the pixels PZ1 in step S300. Next, a conversion of coordinate system is carried out to obtain the corresponding coordinates in the coordinate system R2 using the coordinate transformation TR12. Lastly, the intrinsic parameters of the 3D sensor are used to obtain the two-dimensional coordinates of the corresponding pixels PZ2 in the 3D image I2 as illustrated in FIG. 4.

Figure 4:
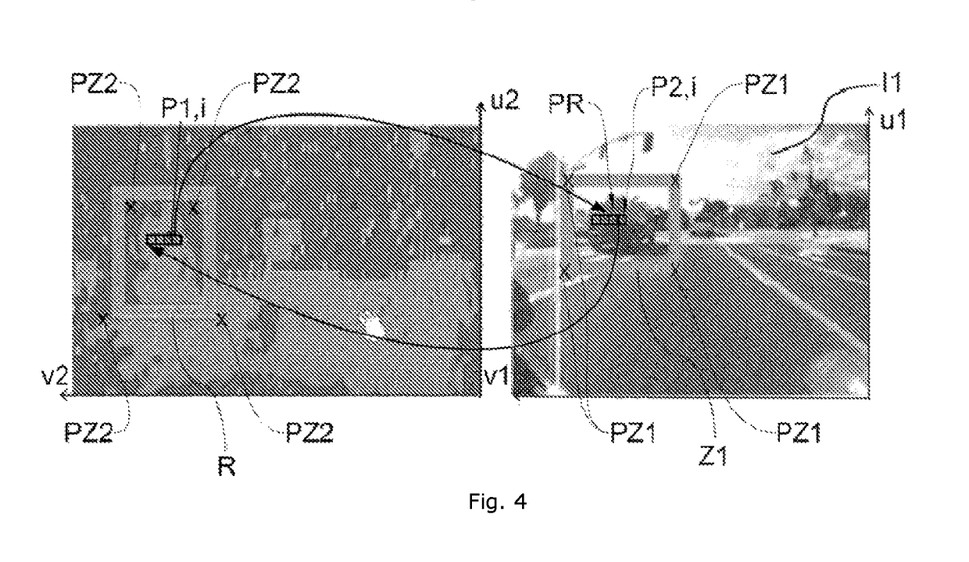
FIG. 4 illustrates certain of the points used by the labeling method according to one embodiment of the invention.

As may be seen in FIG. 4, the pixels PZ2 delineating the region of interest Z2 thus computed d0 not necessarily define a rectangle.

Optionally and facultatively, the method may further comprise a step S500 making it possible, based on the coordinates of the pixels PZ2 delineating the region of interest Z2, to define a rectangle R delineating the region of interest Z2 in the image I2. Via an optimization process, the rectangle R is defined so as to minimize the distance between each corner of the rectangle R and each corresponding pixel PZ2 using a suitable cost function.

The invention claimed is:

1. A method for labeling a 3D image of a scene acquired by a 3D sensor comprising identifying at least one region of interest in the 3D image, the method being implemented by a computer and comprising:
   receiving:
      a 2D image of the same scene, acquired by a camera,
      coordinates, in the 2D image, of a set of pixels delineating the region of interest,
      coordinates, in the 2D image, of a reference point belonging to the region of interest, and
      data relating to the relative position and relative orientation of the camera with respect to the 3D sensor,
   determining the depth of the reference point in a coordinate system associated with the camera, said step comprising:
      based on the coordinates of the reference point in the 2D image, determining the two-dimensional coordinates of a plurality of first points in the 3D image, each first point corresponding to a possible position of the reference point in the 3D image,
      obtaining, for each first point, a third depth coordinate with respect to the 3D sensor,
      for each first point of the 3D image, obtaining the coordinates of the corresponding point in the 2D image, based on the depth coordinate of the first point,
      selecting, in the 2D image, the first point closest to the reference point, and,
      assigning, to the reference point, a depth corresponding to the depth of the first selected point,
   assigning, to the pixels delineating the region of interest in the 2D image, a depth corresponding to the depth assigned to the reference point, and
   computing the coordinates, in the 3D image, of the pixels delineating the region of interest, based on the coordinates of the pixels delineating the region of interest in the 2D image, on the depth assigned to the pixels delineating the region of interest and on the data relating to the relative position and relative orientation of the camera with respect to the 3D sensor.

2. The method as claimed in claim 1, wherein:
   determining the two-dimensional coordinates of the plurality of first points in the 3D image comprises:
      assigning a maximum depth to the reference point,
      assigning a minimum depth to the reference point,
      computing two-dimensional coordinates, in the 3D image, of a first furthest point corresponding to the reference point to which the maximum depth was assigned, computing two-dimensional coordinates, in the 3D image, of a first closest point corresponding to the reference point to which the minimum depth was assigned, and determining the two-dimensional coordinates, in the 3D image, of at least one first point located between the first closest point and the first furthest point.

3. The method as claimed in claim 2, wherein determining the two-dimensional coordinates, in the 3D image, of at least one first point located between the first closest point and the first furthest point comprises determining two-dimensional coordinates of at least one point located, in the 3D image, on a segment connecting the first furthest point and the first closest point.

4. The method as claimed in claim 2, wherein determining the two-dimensional coordinates, in the 3D image, of at least one first point located between the first closest point and the first furthest point comprises:

assigning, to the reference point, at least an intermediate depth comprised between the maximum depth and the minimum depth, and computing two-dimensional coordinates, in the 3D image, of a first point corresponding to the reference point to which the intermediate depth was assigned.

5. The method as claimed in claim 1, wherein determining the two-dimensional coordinates of the plurality of first points in the 3D image comprises:

assigning, to the reference point, a depth of one of a minimum depth or maximum depth, computing two-dimensional coordinates, in the 3D image, of a first end point corresponding to the reference point to which one of a minimum or maximum depth was assigned, and computing, based on the horizontal resolution of the 3D sensor and on the distance between the 3D sensor and the camera, a maximum disparity corresponding to a maximum number of pixels in the 3D image separating the first end point and a point in the 3D image corresponding to the reference point to which the other, minimum or maximum, depth was assigned, determining the two-dimensional coordinates of each point of the 3D image comprised between the first end point and a point laterally separated from the first end point by the maximum disparity.

6. The method as claimed in claim 1, wherein the set of pixels delineating the region of interest in the 2D image comprises four pixels delineating a rectangle.

7. The method as claimed in claim 1, wherein the region of interest, in the 2D image, has a predetermined geometric shape and the method further comprises a step of defining a region of interest in the 3D image having the same geometric shape as the region of interest in the 2D image.

8. A computer program comprising instructions for implementing the method as claimed in claim 1 when this program is executed by a computer.

9. A non-transient computer-readable storage medium on which is stored a program for implementing the method as claimed in claim 1 when this program is executed by a computer.

* * * * *